(12) United States Patent
Winship

(10) Patent No.: US 8,581,120 B2
(45) Date of Patent: Nov. 12, 2013

(54) SLEEVE FOR BARRIER CONNECTOR, AND BARRIER CONNECTOR

(75) Inventor: Phillip Steven Winship, Swadlincote (GB)

(73) Assignee: Cable Management Products Ltd., Birmingham (GB)

( * ) Notice: Subject to any disclaimer, the term of this patent is extended or adjusted under 35 U.S.C. 154(b) by 251 days.

(21) Appl. No.: 13/091,375

(22) Filed: Apr. 21, 2011

(65) Prior Publication Data

US 2011/0259637 A1    Oct. 27, 2011

(30) Foreign Application Priority Data

Apr. 26, 2010   (GB) .................................. 1006948.2

(51) Int. Cl.
*H02G 3/18* (2006.01)

(52) U.S. Cl.
USPC .......... 174/667; 174/650; 174/77 R; 439/271; 439/275; 277/602; 277/603

(58) Field of Classification Search
USPC ................ 174/650, 653, 657, 664, 659, 68.1, 174/68.3, 77 R, 84 R, 85, 93, 667, 656, 655, 174/651, 74 R, 72 A, 652, 76; 439/461, 462, 439/589, 271, 272, 275, 276, 277; 277/602, 277/603, 312, 314, 608, 617, 625, 628
See application file for complete search history.

(56) References Cited

U.S. PATENT DOCUMENTS

| | | | | | |
|---|---|---|---|---|---|
| 4,549,037 | A | * | 10/1985 | Bawa et al. .................... | 174/667 |
| 5,015,804 | A | * | 5/1991 | Nattel et al. ................... | 174/667 |
| 5,399,807 | A | * | 3/1995 | Yarbrough et al. ............ | 174/653 |
| 5,621,191 | A | * | 4/1997 | Norris et al. ................... | 174/653 |
| 6,259,029 | B1 | * | 7/2001 | Hand ........................... | 174/74 R |
| 6,737,584 | B2 | * | 5/2004 | Kiely ............................. | 174/656 |
| 6,809,263 | B2 | * | 10/2004 | Jackson ......................... | 174/651 |
| 6,812,406 | B2 | * | 11/2004 | Hand ............................. | 174/667 |
| 7,781,685 | B2 | * | 8/2010 | Bartholoma et al. .......... | 174/655 |
| 8,288,667 | B2 | * | 10/2012 | Chiou ............................ | 174/656 |
| 8,367,944 | B2 | * | 2/2013 | Chiou ............................ | 174/653 |
| 2009/0174154 | A1 | | 7/2009 | Chiu | |

FOREIGN PATENT DOCUMENTS

| | | |
|---|---|---|
| DE | 20108715 U 1 | 10/2001 |
| EP | 0 214 819 A2 | 3/1987 |
| GB | 2116784 A | 9/1983 |
| KR | 100937194 B1 | 1/2010 |

\* cited by examiner

*Primary Examiner* — Angel R Estrada

(74) *Attorney, Agent, or Firm* — Snyder, Clark, Lesch & Chung, LLP

(57) ABSTRACT

A barrier connector has a through bore for the passage of cables (103) which are sealed with an epoxy putty (104). A cup (25) and insert (35) define an annulus within which the putty is confined. A circular groove (42) is provided in one end of the insert to lock the putty against radial shrinkage or expansion.

14 Claims, 1 Drawing Sheet

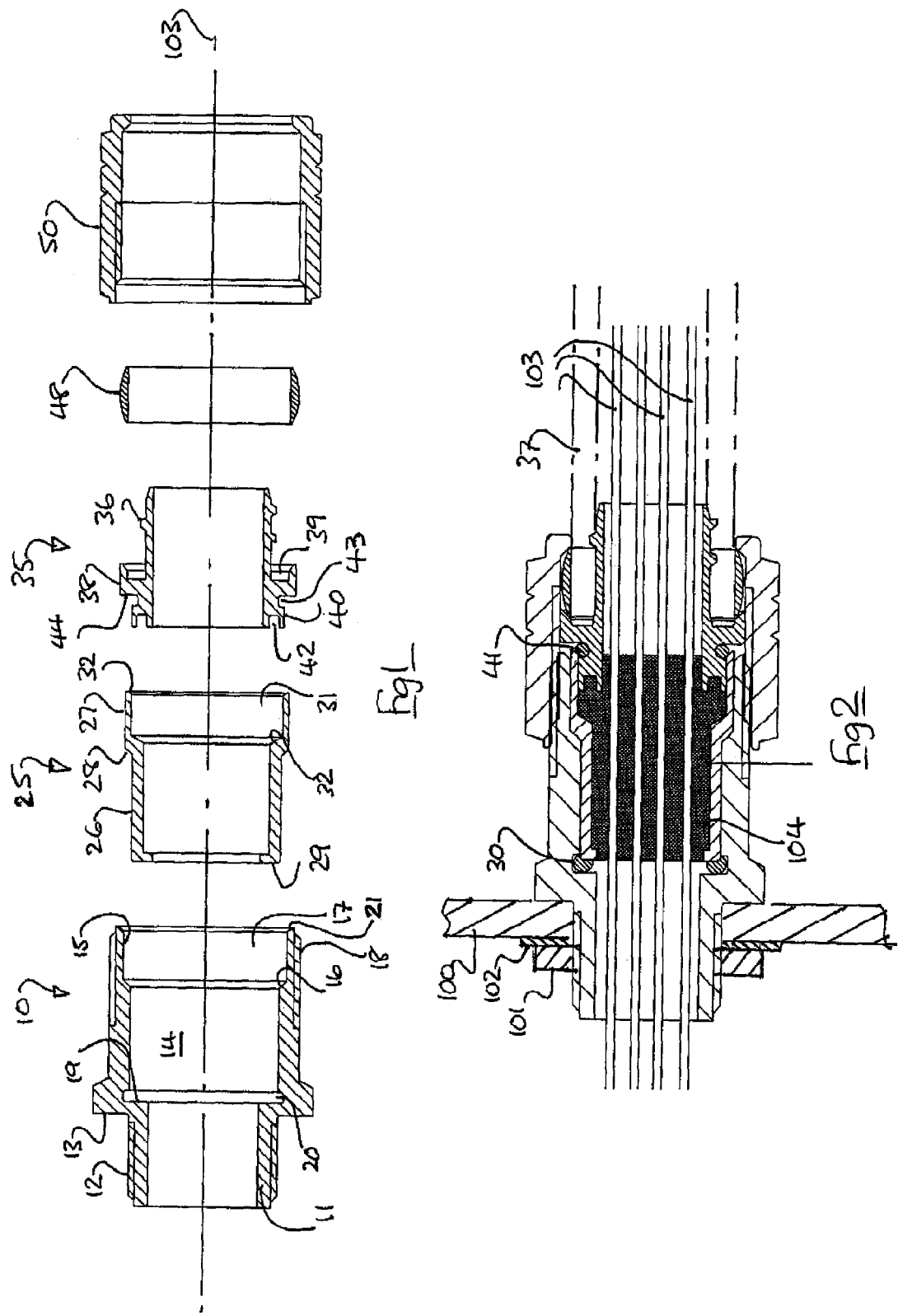

SLEEVE FOR BARRIER CONNECTOR, AND BARRIER CONNECTOR

RELATED APPLICATION

This applicaiton claims priority under 35 U.S.C. §119 based on United Kingdom (GB) Patent Application No. 1006948.2, filed Apr. 26, 2010, the disclosure of which is hereby incorporated by reference herein.

TECHNICAL FIELD

This invention relates to a sleeve for a bather connector, intended to seal an aperture in a barrier through which electrical cores (cables) pass in use.

BACKGROUND TO THE INVENTION

It can be appreciated that electrical cores may need to be sealed to a barrier, such as a bulkhead, in order to isolate one side of the barrier from the other. For example the barrier may comprise an enclosure having a noxious or explosive atmosphere on the inside, or there may be equipment within an enclosure which must be hermetically sealed for safe operation.

Various kinds of barrier connector have been proposed. Typically barrier connectors are provided with varying bore sizes, and an operator selects a connector having a bore adequate for the number of cores to be passed through the barrier. Single or multiple cables may pass through a barrier connector, and typically the connector will be specified in relation to the maximum diameter of multiple cores, the maximum diameter of a single core, and the maximum number of cores.

Some means must be provided for sealing the passage through the connector, because no matter how tightly fitted, some interstices between the cores will remain. Frequently these interstices may be quite large, especially if the cores are loosely fitted in the connector.

Usually a two-part epoxy putty is stuffed into the bore of the connector to make a seal—such putty is mixed just prior to stuffing, and cures to a hard substance after about 4 hours. The putty is typically confined within a tight-fitting sleeve within the connector, so as to permit the sleeve and core assembly to be disassembled from the other parts of the connector.

Other features of a typical connector are an ability for attachment to the barrier, and the ability to accept a cable sheath (conduit) which protects the core(s) between the barrier and the equipment to which they are connected in use.

Current designs of barrier connector have disadvantages which the present invention seeks to address.

SUMMARY OF THE INVENTION

According to the invention there is provided a sleeve of a barrier connector, said sleeve comprising a circular cup having a through bore for a core, and a mouth at one end of said bore,
and a circular insert insertable in said mouth and also having a through bore for a core,
said cup and insert together defining an annulus therebetween, said annulus extending radially outwardly of said through bores, and one of said cup and insert defining a groove facing in the direction of the axis of said through bores into said annulus.

In one embodiment the circular cup defines a mouth at one end and an internal shoulder facing said mouth, and the close-fitting tubular insert is insertable into said mouth, said insert having an external shoulder to limit insertion depth thereof. The groove is preferably provided in a substantially radial end face of the insert. The annulus typically has a dimension of 3-7 mm in the direction of the through axis, and in a preferred embodiment has an axial dimension of 5 mm.

In use the cup and insert of the invention are assembled with core(s) passing therethrough, and a curable putty is poured or stuffed into the internal space so as to fill interstices therein. Putty enters the annular space, and also the groove. Upon curing the groove acts to resist radial movement of the putty, thus substantially eliminating a potential cause of leakage. The groove may be pre-filled prior to inserting the insert into the cup.

An advantage of the groove is that any shrinkage of the putty tends to lock the putty onto the minor diameter of the groove so clamping the grooved component tightly.

The invention further comprises an externally threaded body defining a recess to receive the cup, and an abutment to limit insertion thereof; and a nut for screw threading on the body and having an internal rim engageable with said insert so as to urge the insert toward the cup.

The body and nut permit the sleeve (comprising cup and insert) to be clamped therein, thus providing a unitary component for attachment to a barrier.

The body preferably has an internal abutment which is circular and continuous. In a preferred embodiment the internal abutment comprises a circular planar face at an acute angle to the through axis of the cup, that is to say non-radial, and tapering from the major diameter to the minor diameter away from said mouth. The angle of this face may be in the region of 35-65°, and in the preferred embodiment is 45°.

In a preferred embodiment the cup includes an external shoulder for engagement with the abutment of the body. This external shoulder of the cup is preferably non-radial and is constituted by a planar circular face at an acute angle to the through passage of the cup and tapering outwardly toward the mouth end. Preferably the angle of the internal abutment of the body and the external shoulder of the cup match so as to provide corresponding clamp faces.

The cup may further include a continuous inturned rim at the end opposite the mouth so as to define an annulus radially outside the maximum core diameter. Such an arrangement eases potting after core insertion, and provides an end stop for putty which is urged towards the base of the cup on assembly of the barrier connector.

Preferably the internal bore of the insert is less than the minimum internal bore of the cup, and in a preferred embodiment is less than the internal diameter of said inturned rim.

The internal shoulder of the cup is preferably immediately adjacent the external shoulder, and comprising an angled circular planar surface facing inwardly and towards the mouth of the cup. The angle of this face is preferably in the range 45-75° to the axis of the through bore, and in a preferred embodiment is 60°.

The internal shoulder constitutes one side of the annulus defined between the cup and insert, and is angled so as to direct putty towards the base of the cup upon assembly of the inset and cup.

Preferably the mouth of the cup has an internal chamfer to define a circular pocket for an "O" ring. In the preferred embodiment an "O" ring is provided between said chamfer and the external shoulder of said insert. This "O" ring provides for further clamping of a curable putty after curing.

The body may also define an internal groove for an "O" ring engageable in use with the end of the cup opposite to the mouth, in the region of the interned rim. Such an "O" ring provides a seal for the prevention of ingress of extraneous matter in use, such as water. Preferably the usual flame path extends between the body and the cup by virtue of a very small radial clearance, in the region of 0.15 mm.

Typically the body has a reduced external diameter at the end opposite said nut to define a stub for insertion through one side of a barrier, and a retainer is provided to secure the stub on the other side of the barrier; a screw thread and lock nut is commonly used. Alternatively the barrier may have a threaded bore to directly receive a threaded stub. Other securing arrangements are possible.

BRIEF DESCRIPTION OF DRAWINGS

Other features of the invention will be apparent from a description of a preferred embodiment, shown by way of example in the accompanying drawings in which:—

FIG. 1 is an exploded view of the main component of a barrier connector; and

FIG. 2 illustrates the connector of FIG. 1 in assembled form with cores and conduit.

With reference to the drawings, an annular body 10 defines at one end a reduced diameter stub 11 having an external threaded portion 12 for insertion through an aperture in a barrier 100. An abutment 13 of the body is clamped by a lock nut 101 and washer 102 in use to retain the body in the barrier. The body may alternatively be directly screwed into the barrier.

Internally the body defines a stepped bore 14 having a larger diameter portion 15 adjacent the mouth 17 thereof. The single step comprises a circular shoulder 16 having an angled planar surface facing towards the through axis 103.

The body 10 also has an external thread 18 at the mouth end to receive a nut 50, as will be described below.

The internal diameter of the stub 11 is reduced so as to define a circular radial abutment 19 facing towards the mouth, and a seal groove 20 is provided immediately adjacent this abutment on the mouth side. As illustrated, the mouth 17 has an internal circular chamfer 21 at the lip thereof.

A stepped circular cup 25 has a small diameter outer portion 26 and a large diameter outer portion 27 separated by an angled circular step 28. These outer diameter portions 26, 27 are dimensioned to fit closely within the stepped base of the body 10 so as to define a small radial gap which in use constitutes a flame path. The flame path is not an important feature of the present invention, and if provided has a maximum radial dimension of around 0.15 mm. The angle of the step 28 matches the angle of the shoulder 16, so as to give a close fit, and is at 45° to the axis 103.

The small diameter outer portion 26 terminates at an inturned lip 29, which thus defines a maximum diameter for the passage of core(s) through the cup 25; the lip 29 also ensures that an annulus of potting material can be formed around such cores. The outer surface of the lip presents a smooth surface for compression of an "O" ring seal 30 which is housed in the seal groove 20 (FIG. 2) to prevent ingress of matter, such as moisture and/or gas.

The large diameter outer portion 27 terminates at a mouth 31 which in use lies under the transverse plane of the mouth 17 of the body 10, thus ensuring that clamp forces are directed onto the cup 25. On the inside the cup has a step 32 between portions 26 and 27, which step comprises an angled planar surface facing the mouth 31 but at an angle of 60° with respect to the axis 103.

The mouth 31 of the cup has an internal chamfer 32 to engage a seal, as will be further described.

An annular insert 35 has a plain bore and an outer surface defining at one end a scroll 36 to receive a conventional outer conduit 37 of a core. A radially outward end stop 38 defines a pocket 39 to receive and protect the end of the conduit 37. At the other end the insert has a circular boss 40 having an outer diameter selected as a sliding fit within the mouth 31 of the cup 25. This boss defines in the radial end face a circular groove 42. The internal diameter of the insert is about the same as the internal diameter of the circular lip 29 and stub 11.

A seal groove 43 is provided on the outer diameter of the insert between the boss 39 and end stop 38, and receives an "O" ring 41 (FIG. 2) which engages the chamfer 32 of the cup. A radial face 44 of the end stop 38 constitutes an abutment for engagement with the mouth 31 of the cup under certain conditions of use, to be described.

A conventional olive 48 is provided around the conduit 37, and is clamped by a conventional gland nut 50 engageable with the head 18 of the body 10 (FIG. 2).

FIG. 2 shows a complete barrier connector incorporating the invention, and installed in an operative of a barrier 100. Assembly of the connector is as follows:

Components having an internal diameter suitable for the number of core(s) 103 are selected. It is assumed that the core(s) are sheathed, and protrude from the sheath by the required amount.

The core(s) are passed through the nut 50, olive 48, insert 35 and cup 25 in order, and the portion within the cup 25 and adjacent part of the insert 35 is packed with a suitable sealing putty 104 (FIG. 2). The putty 104 may to some extent be pre-loaded into the cup and insert, in particular the groove 42 and an annulus inside the mouth 31. The conduit is located on the scroll of the insert.

A barrier (not shown) may be provided in the insert 35 to permit a pourable sealant to be placed around the cores with the axis 103 substantially vertical.

The components are assembled and the gland nut is screwed up sufficiently to compress the putty without forcing it out of the sleeve. Once cured, the nut 50 is tightened.

With reference to FIG. 2, the tightening step compresses the olive 48 and the conduit 37 to tightly secure the sheath to the insert 35. At the same time, the insert is urged towards the body 10 so that the "O" ring 41 is compressed together with the annulus of cured putty which lies between the step 32 and the groove 42. The groove 42 has the effect of locking the putty radially so as to resist expansion or contraction in use.

The putty cures to an incompressible state; however it will be appreciated that tightening of the nut 50 will tend to pre-load the annulus of cured putty so as to deal with any slight shrinkage or movement of the joint in service, due to expansion and contraction under extremes of temperature. The "O" ring seal 41 permits such tightening, but it is not envisaged that the face 44 will come into contact with the rim of the mouth of the cup in normal conditions.

The body 10 is secured through the barrier by conventional lock nut 101 and washer 102, through other means are possible. If necessary it will be appreciated that disassembly is possible by unscrewing the nut 50, whereupon the sheath, olive, insert, cup and core(s) can be withdrawn as a unit.

For a conventional flame and pressure proof barrier connector, the components illustrated in FIG. 1 will be of metal. Typically the body, cup, insert olive and nut will be of brass. The body and nut could be of stainless steel.

Although described with a scroll 36, the insert could be truncated at the right side (as viewed) of the abutment face 44 so as to accommodate alternative kinds of cable sheath which do not require an olive, such as a tube terminating in a threaded nut (which may be straight or an elbow). Alternatively no sheath may be necessary in which case the gland nut 50 bears directly upon the insert 35.

The invention has been described in relation to electrical cores, but is clearly applicable to other kinds of linear component which may have to pass into a sealed enclosure. Such components could be for example be Bowden cables, or hydraulic conduits or pneumatic conduits.

The invention claimed is:

1. A sleeve of a barrier connector, comprising:
   a circular cup having a first through bore for a cable, and a mouth at one end of said first through bore, and
   a circular insert insertable in said mouth and having a second through bore for a cable,
   said cup and insert together defining an annulus therebetween, said annulus extending radially outwardly of said first and second through bores, and one of said cup and insert defining a groove having a base and two sidewalls and facing in the direction of the axis of said first and second through bores into said annulus, wherein the groove is configured to engage a sealant inserted in the annulus.

2. A sleeve according to claim 1 wherein said groove is circular and continuous, and is provided in an end face of said insert.

3. A sleeve according to claim 1 wherein the first through bore of said cup has an internal step, said step defining one axial end of said annulus.

4. A sleeve according to claim 3 wherein said step comprises a circular face of substantially constant width.

5. A sleeve according to claim 4 wherein said face is at an acute angle to a transverse plane of said cup, and faces inwardly.

6. A sleeve according to claim 1 wherein said insert includes a projection extending radially outwardly thereof, said projection being adapted to limit insertion of the insert into said mouth.

7. A sleeve according to claim 6 wherein a circular seal groove is provided around said insert between said projection and the end face insertable into said cup.

8. A sleeve according to claim 7 wherein the mouth of said cup has an internal chamfer facing said seal groove in use.

9. A sleeve according to claim 1 wherein the base of said cup comprises a continuous inturned lip.

10. A sleeve according to claim 1 wherein the outer surface of said cup is radially stepped to define a major diameter adjacent the mouth end, and a minor diameter at the opposite end.

11. A sleeve according to claim 1, further comprising:
    a core in said first and second through bores, and
    a cured sealant in said annulus, said sealant extending into each of said first and second through bores to seal said core therein.

12. A barrier connector including a sleeve assembly according to claim 1.

13. The sleeve of claim 1, wherein the groove is formed between an inner diameter and an outer diameter of the circular insert.

14. The sleeve of claim 1, wherein the sealant comprises a cured compound, and wherein the groove is configured to be filled by the cured compound and the groove acts to resist radial movement of the cured compound.

* * * * *